No. 685,246. Patented Oct. 29, 1901.
J. D. BODEN.
AUTOMATIC VEHICLE BRAKE.
(Application filed Dec. 8, 1900.)
(No Model.)
3 Sheets—Sheet 1.
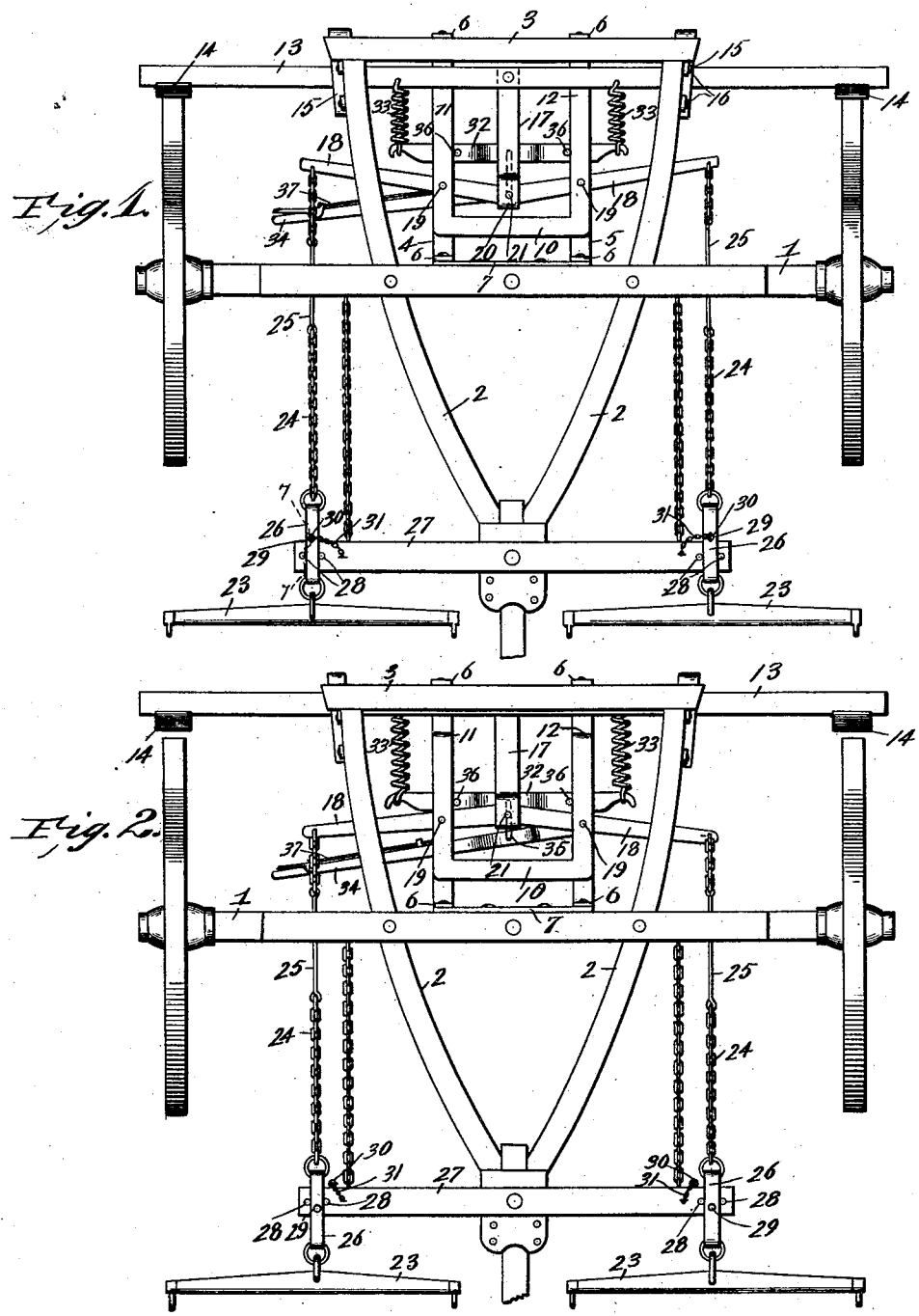
Witnesses
J. D. Boden, Inventor,
By C. A. Snow & Co.
Attorneys No. 685,246. Patented Oct. 29, 1901.
J. D. BODEN.
AUTOMATIC VEHICLE BRAKE.
(Application filed Dec. 8, 1900.)
(No Model.) 3 Sheets—Sheet 2.
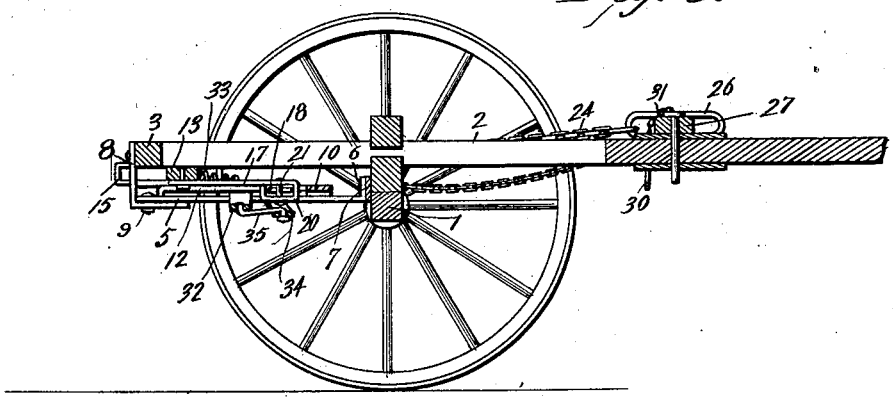
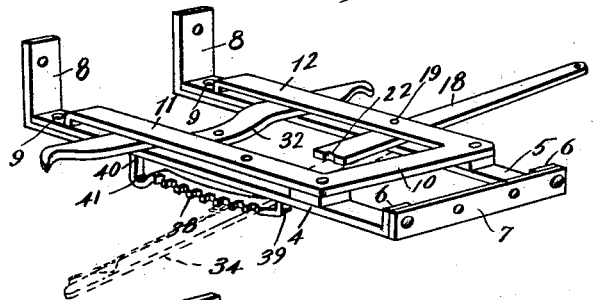
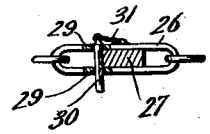
J. D. Boden, Inventor.

No. 685,246. Patented Oct. 29, 1901.
J. D. BODEN.
AUTOMATIC VEHICLE BRAKE.
(Application filed Dec. 8, 1900.)

(No Model.) 3 Sheets—Sheet 3.

Witnesses
C. H. Walker
H. J. Shepard

J. D. Boden, Inventor,
by C. A. Snow & Co.
Attorneys

UNITED STATES PATENT OFFICE.

JAMES D. BODEN, OF PARIS, TENNESSEE.

AUTOMATIC VEHICLE-BRAKE.

SPECIFICATION forming part of Letters Patent No. 685,246, dated October 29, 1901.

Application filed December 8, 1900. Serial No. 39,202. (No model.)

*To all whom it may concern:*

Be it known that I, JAMES D. BODEN, a citizen of the United States, residing at Paris, in the county of Henry and State of Tennessee, have invented a new and useful Automatic Vehicle-Brake, of which the following is a specification.

This invention relates to vehicle-brakes, and has for its object to provide an improved device of this character which is automatically applied when the draft slackens and is normally in operation when the vehicle is at rest, but is arranged to be thrown out of operation when the vehicle starts ahead. It is furthermore designed to arrange for adjusting the means for normally applying the brake, so that the brake may be accommodated to light and heavy vehicles and also in order that it may require a comparatively strong or weak draft to draw the brake away from the wheels, according to existing circumstances. Moreover, there is an arrangement for locking the brake in its operative position, so as to prevent the draft-animals from starting the vehicle until the brake has been unlocked.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 8:
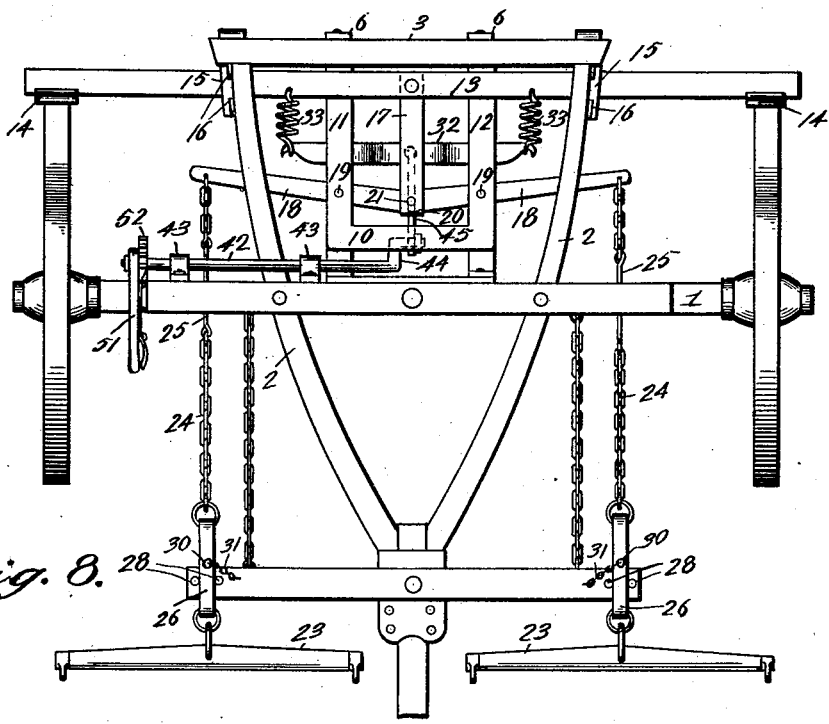
Figure 9:
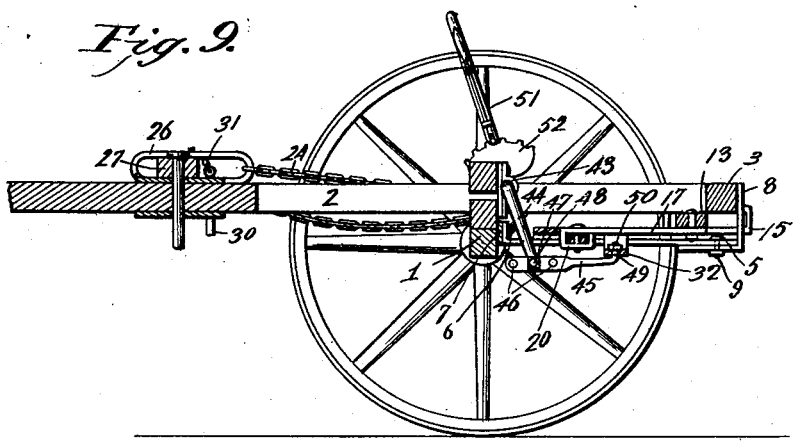

In the drawings, Figure 1 is a plan view of the front truck of a vehicle having the improved brake applied thereto and shown in its operative position. Fig. 2 is a similar view showing the brake thrown out of engagement with the wheels by the draft of a team. Fig. 3 is a central longitudinal sectional view thereof. Fig. 4 is a detail perspective view of the frame for supporting the actuating parts of the brake. Fig. 5 is a detail perspective view of one of the adjustable connections between the rear of the supporting-frame and the cross-bar which connects the hounds. Fig. 6 is a detail view of one of the brackets for slidably supporting the brake-beam. Fig. 7 is a detail sectional view of the link 26 shown in Fig. 1. Figs. 8 and 9 illustrate the preferred form of the brake-adjusting mechanism.

Like characters of reference designate corresponding parts in all of the figures of the drawings.

In the accompanying drawings, 1 designates an ordinary wheeled axle of the front truck of a vehicle and supports the usual hounds 2, which are connected at their rear ends by means of a suitable cross-bar 3. These parts are common and well known, and therefore may have any preferred form, as they have been shown in the drawings to more adequately illustrate the application and operation of the present improvements.

In carrying out the present invention there is provided a supporting-frame comprising the opposite metallic sills or frame-bars 4 and 5, which have their front ends provided with upstanding ears 6, which are connected by a cross-bar 7, the intermediate portion of the latter being bolted to the rear side of the axle. The rear end of each sill is made longitudinally adjustable by means of a substantially L-shaped extension 8, the horizontal arm of which is applied to the upper side of the rear end of the adjacent sill, and is also provided with a longitudinal slot 8ᵃ for the reception of the fastenings 9, whereby the extension is adjustably connected to the sill. The rear ends of the sills are passed beneath the cross-bar 3, and the upstanding arms of the adjustable extensions are bolted or otherwise secured to the rear side of the said cross-bar, as best shown in Fig. 3 of the drawings. By this arrangement the sills may be adjusted to accommodate the frame to the distance between the axle and the cross-bar of the hounds. A yoke-shaped frame 10 is supported upon the intermediate portions of the sills, so that the opposite sides 11 and 12 thereof may form superposed frame-bars which coöperate with the sills to form opposite longitudinal slots arranged in a horizontal plane for the slidable reception of the brake-levers and the brake-adjusting cross-head.

The brake-beam 13 is located below the rear ends of the hounds and is provided at opposite ends with the usual brake-shoes 14 for application to the peripheral edges of the wheels and is hung in the opposite brackets 15, secured to the rear ends of the respective hounds. One of these brackets is shown in detail in Fig. 6 of the drawings and is in the form of a rectangular or oblong frame or open-sided box having the attaching-ears 16, whereby the bracket is suspended from the hounds with the brake-beam projecting slidably through the open portion of the bracket.

For operating the brake-beam there is provided a forwardly-extending arm 17, which is secured to the brake-beam midway of its opposite ends, lies between the opposite sides of the supporting-frame, and terminates short of the front end thereof. The opposite brake-levers 18 extend through the respective slots formed by the top and bottom sides of the frame and are fulcrumed intermediate of their ends thereon, as indicated at 19. As best indicated in Fig. 3 of the drawings, it will be seen that the forward end of the arm 17 is formed into a loop or stirrup 20 for the reception of the inner ends of the brake-levers and is also provided with an intermediate vertical pin 21, which is received within the notch 22 of each lever, (shown in Fig. 4,) whereby a pivotal connection is had between the levers and the arm without overlapping the ends of the levers. The free end of each lever projects beyond the adjacent hound and is connected to the adjacent whiffletree 23 by means of a chain 24, the latter having an intermediate rod 25, which passes over the axle, so as to prevent the chain from becoming caught in the axle. The connection between the chain and the whiffletree is had by means of a link 26, which slidably embraces the adjacent end of the usual doubletree 27, said link being guided and retained upon the doubletree or draw-bar by means of opposite guide pins or shoulders 28 or in any other preferred manner.

From the foregoing description it will be apparent that the team is connected to the brake-levers, whereby the brake-beam is operated by the strain of the draft, and in order to lock the brake mechanism against operation by the team each link is provided with an intermediate perforation 29, which lies at the rear side of the doubletree when the vehicle is at rest, as best shown in Fig. 7, and a locking-pin 30 is passed downwardly through the corresponding perforations in the opposite upper and lower sides of the link, so as to bear against the rear side of the doubletree, and thereby prevent forward movement of the link, and consequently prevent the operation of the brake to relieve the brake-shoes from engagement with the wheels of the vehicle. It will be understood that the brake is normally in engagement with the wheels of the vehicle, so that by locking the brake in this normal position it is impossible for the team to start the vehicle without the brake being first released by removing the locking-pins. To prevent loss of the pins, they are secured to the doubletree by means of a chain or other flexible connection 31.

As hereinbefore stated, the brake is normally in engagement with the wheels, and to carry out this design there is provided an adjustable cross-head 32, which lies transversely below the arm 17 and has its opposite ends projected laterally outward through the opposite slots of the supporting-frame and is designed to slide laterally therein. Between the opposite ends of the cross-head and the brake-beam are the respective coiled springs 33. Located in advance of this adjustable cross-head is an adjusting ratchet-lever 34, which, as best shown in Fig. 2 of the drawings, lies below the supporting-frame and has its inner end fulcrumed upon the pivotal support of the opposite brake-lever, while its outer end is projected beyond the hounds, so as to be in convenient reach for operation from the side of the vehicle. As best indicated in Fig. 3, it will be seen that the intermediate portions of the cross-head and the adjusting-lever are bowed downwardly, so as to clear the brake-arm 17 and the brake-levers, and the adjacent intermediate portions of these two parts are pivotally connected by means of a substantially Z-shaped link 35. To prevent endwise displacement of the cross-head, the latter is provided with the opposite stop-pins 36 to engage the inner sides of the frame. An ordinary ratchet device 37 is provided upon the adjusting-lever and has its inner end arranged to engage with a rack 38, secured to the under side of the frame, as shown in Fig. 4. This rack has its opposite ends provided with upstanding attaching-arms 39 and 40, whereby the rack is hung from the frame, so that the lever may engage said rack without interfering with the brake-levers. At the rear end of the rack there is provided a depressed seat 41 for the reception of the lever when there is no tension placed upon the brake-beam.

It will now be apparent that the brake-shoes may be normally held in engagement with the vehicle-wheels by the adjustment of the ratchet-lever, and the tension upon the springs may also be regulated to accommodate the brake to a heavy or light vehicle and also to vary the amount of draft required to release the brake. Moreover, any number of springs may be employed, and for a light vehicle one spring may be used by connecting the same to the intermediate portions of the cross-head and the brake-beam and below the arm 17.

I have hereinbefore described one form of brake-adjusting mechanism, and I will now describe the preferred form of such mechanism, as shown in Figs. 8 and 9 of the drawings. Instead of the ratchet-lever there is provided a horizontal transverse rock-shaft 42, which is mounted at the rear of the adjacent axle by means of suitable bearings 43, carried by the rear side of the bolster. The inner end of this shaft terminates about midway of the axle in a crank 44, which is normally pendent from the shaft and connected to the cross-head 32 by means of a link 45. As best shown in Fig. 9, this link has its forward end flattened and provided with a plurality of perforations 46 for the adjustable reception of a transverse pin 47, carried by the outer extremity of the crank. This pin has its outer end screw-threaded for the reception of a nut 48, whereby the link and the crank are adjustably connected in order to accommodate the device to vehicles having wheels of different sizes. The rear end of the link is substantially L-shaped, so as to form a transverse pin 49, which passes through a perforation in the middle of the cross-head 32 and has a nut 50 upon its outer end for detachably securing the link to the cross-head.

For convenience in operating the rock-shaft an upstanding ratchet-lever 51 is fixed to the outer end of the shaft and is located between the body of the vehicle and the adjacent wheel, so as to be in convenient reach from the interior of the vehicle. An upstanding rack 52 is mounted upon the adjacent portion of the axle outwardly from the end of the bolster and arranged for engagement with the ratchet device of the lever.

From the foregoing description it will be apparent that the latter form of adjusting mechanism has the advantage of being manipulated from the body of the vehicle, while the other form can be operated from the ground only. The difference between the two forms resides in the difference in location of the ratchet-levers and the consequent different connections between the levers and the cross-head; otherwise the devices are the same and operate in like manner to adjust the tension of the springs upon the brake-beam.

What is claimed is—

1. The combination with a wheeled axle, having hounds, of a frame supported by the axle and the hounds, a normally-applied brake-beam, a slidable cross-head mounted upon the frame, an adjusting ratchet-lever, means for connecting the lever to the cross-head, terminal springs between the cross-head and the brake-beam, a releasing brake-lever fulcrumed intermediate of its ends upon the frame, a connection between one end of the lever and the brake-beam, and a draft connection applied to the opposite end of the lever.

2. The combination with a wheeled axle, having hounds, and a cross-bar connecting the hounds, of opposite sills extending between the cross-bar and the axle, superposed side pieces supported upon the sills and forming therewith a slotted frame, a brake-beam extending transversely across the frame, a cross-head slidably mounted in the opposite slots of the frame, one or more springs between the cross-head and the brake-beam, an adjusting ratchet-lever, a link connection between the intermediate portion of the cross-head and the lever, an intermediate brake-arm projecting forwardly from the beam, a releasing brake-lever fulcrumed intermediate of its ends upon the frame, and having one end connected to the arm, and a draft connection applied to the opposite end of the brake-lever.

3. The combination with a spring-actuated vehicle-brake, of means for adjusting the tension thereof, consisting of a ratchet-lever, and means for connecting the same to the spring of the brake.

4. In an automatic vehicle-brake, the combination with the running-gear of a vehicle, having a doubletree or draw-bar, of a normally-applied brake, a releasing draft connection applied to the brake, and also having a slidable connection with the draw-bar, and means for locking the slidable connection between the draft connection and the draw-bar.

5. In an automatic vehicle-brake, the combination with the running-gear of a vehicle, having a draw-bar, of a normally-applied brake, a releasing connection applied to the brake, a slotted link included in the draft connection and slidably embracing the draw-bar, and a locking-pin removably received within corresponding perforations in the link and engaging the draw-bar.

6. In an automatic vehicle-brake, the combination with the running-gear of a vehicle, having a draw-bar, of a brake, an operating draft connection applied thereto, a slotted link included in the draft connection and slidably embracing the draw-bar, the opposite sides of the link having corresponding perforations lying in rear of the draw-bar when the brake is applied, and a locking-pin to be received within the corresponding perforations and lie against the rear side of the draw-bar, and having a flexible connection with the draw-bar.

7. The combination with a spring-actuated vehicle-brake, of means for adjusting the tension thereof, comprising a rock-shaft in operative relation to the spring, and means for turning the shaft.

8. The combination with a spring-actuated brake, of means for adjusting the tension thereof, comprising a rock-shaft in operative relation to the brake, and a ratchet-lever carried by the shaft.

9. The combination with a spring-actuated brake, of means for adjusting the tension thereof, comprising a rock-shaft, having one end provided with a crank, a connection between the latter and the brake, and a ratchet-lever carried by the opposite end of the shaft.

10. The combination with a spring-actuated brake, of means for adjusting the tension thereof, comprising a rock-shaft, having a crank, a longitudinally-adjustable connection between the crank and the brake, and operating means for the shaft.

11. The combination with a spring-actuated brake, of means for adjusting the tension thereof, comprising a rock-shaft, having a crank, provided with a lateral pin, an adjustable link connection between the shaft and the brake, and having a plurality of perforations for the adjustable reception of the pin on the crank, and means for turning the shaft.

12. The combination with a wheeled axle, and a spring-actuated brake carried thereby, of means for adjusting the tension of the brake, comprising a rock-shaft, having a connection with the brake, a ratchet-lever rising from the outer end of the shaft, and a rack carried by the axle and in operative relation to the lever.

13. The combination with a wheeled axle, and a spring-actuated brake carried thereby, of means for adjusting the tension of the brake, comprising a rock-shaft mounted upon the axle, and having its inner end provided with a crank, a connection between the crank and the brake, an upstanding ratchet-lever carried by the outer end of the shaft and located adjacent to the inner side of the adjacent wheel, and a rack carried by the axle and in operative relation to the lever.

In testimony that I claim the foregoing as my own I have hereto affixed my signature in the presence of two witnesses.

JAMES D. BODEN.

Witnesses:
W. E. MOODY,
C. C. THARPE.